(12) United States Patent
Greene et al.

(10) Patent No.: US 8,192,828 B2
(45) Date of Patent: *Jun. 5, 2012

(54) MATERIAL FORMED OF MULTIPLE LINKS AND METHOD OF FORMING SAME

(75) Inventors: Pamela S. Greene, Portland, OR (US); David Brack, Vancouver, WA (US)

(73) Assignee: Nike, Inc., Beaverton, OR (US)

( * ) Notice: Subject to any disclaimer, the term of this patent is extended or adjusted under 35 U.S.C. 154(b) by 1808 days.

This patent is subject to a terminal disclaimer.

(21) Appl. No.: 11/005,146

(22) Filed: Dec. 6, 2004

(65) Prior Publication Data

US 2006/0134351 A1 Jun. 22, 2006

(51) Int. Cl.
*B32B 3/24* (2006.01)
(52) U.S. Cl. ............... 428/131; 428/138; 245/11; 245/9
(58) Field of Classification Search .................. 428/131, 428/138; 245/11, 9
See application file for complete search history.

(56) References Cited

U.S. PATENT DOCUMENTS

| | | | | |
|---|---|---|---|---|
| 2,505,509 A | * | 4/1950 | Varela | 160/229.1 |
| 2,577,350 A | | 12/1951 | Morin | |
| 2,596,188 A | | 5/1952 | Webb | |
| 2,619,306 A | * | 11/1952 | Van Lake | 245/9 |
| 2,752,636 A | | 7/1956 | Morin | |
| 2,829,402 A | | 4/1958 | Morin | |
| 3,261,451 A | * | 7/1966 | Roinestad | 198/852 |
| 3,262,549 A | | 7/1966 | Stewart et al. | 198/178 |
| 3,647,505 A | | 3/1972 | Bjorn-Larsen | 117/37 R |
| 3,676,940 A | | 7/1972 | Shively | |
| 3,870,141 A | | 3/1975 | Lapeyre et al. | 198/193 |
| 3,952,351 A | | 4/1976 | Gisbert | |
| D247,527 S | | 3/1978 | Foldes | |
| 4,265,032 A | | 5/1981 | Levine | |
| 4,267,648 A | | 5/1981 | Weisz | |
| 4,283,864 A | | 8/1981 | Lipfert | |
| 4,707,934 A | | 11/1987 | Hart | |
| 4,922,986 A | | 5/1990 | Leibowitz | 160/178.1 |
| 5,096,335 A | | 3/1992 | Anderson et al. | 405/288 |
| 5,139,135 A | * | 8/1992 | Irwin et al. | 198/852 |
| 5,215,185 A | | 6/1993 | Counter et al. | 198/853 |
| 5,266,062 A | | 11/1993 | Runckel | |
| 5,964,340 A | | 10/1999 | Dolan | 198/853 |
| 6,696,003 B2 | | 2/2004 | Cediel et al. | 264/255 |
| 6,763,611 B1 | | 7/2004 | Fusco | |
| 2002/0012784 A1 | | 1/2002 | Norton | |

(Continued)

FOREIGN PATENT DOCUMENTS

CH 174 340 1/1935

(Continued)

OTHER PUBLICATIONS

International Search Report for PCT/US2005/044196, Apr. 25, 2006.

(Continued)

*Primary Examiner* — William P Watkins, III
(74) *Attorney, Agent, or Firm* — Banner & Witcoff, Ltd.

(57) ABSTRACT

A material includes a frame having at least one elongate member formed of a first polymer. At least one link is formed of a second polymer, with a portion of each link co-molded about a portion of at least one elongate member, and at least one link movable with respect to a corresponding elongate member.

49 Claims, 9 Drawing Sheets

U.S. PATENT DOCUMENTS

2004/0074108 A1 4/2004 Shikhashvili

FOREIGN PATENT DOCUMENTS

| EP | 0 089 930 | 9/1983 |
|----|-----------|--------|
| FR | 880 378 | 3/1943 |
| FR | 891 827 | 3/1944 |
| FR | 896 838 | 3/1945 |
| WO | WO 2005/009162 | 2/2005 |

OTHER PUBLICATIONS

Office Action issued Feb. 6, 2009 in corresponding Chinese Patent Application No. 2005800460805.9 and English translation thereof.
Office Action issued Oct. 23, 2009 in corresponding Chinese Patent Application No. 2005800460805.9 and English translation thereof.
Office Action issued Oct. 19, 2010 in corresponding Chinese Patent Application No. 200580046805.9 and English translation thereof.

* cited by examiner

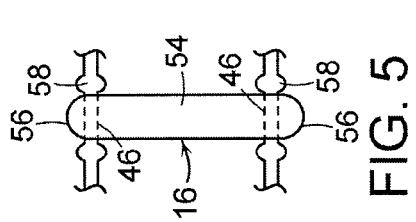
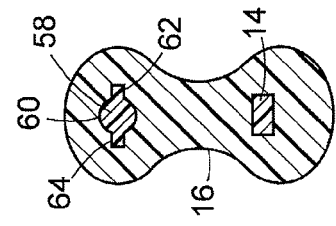
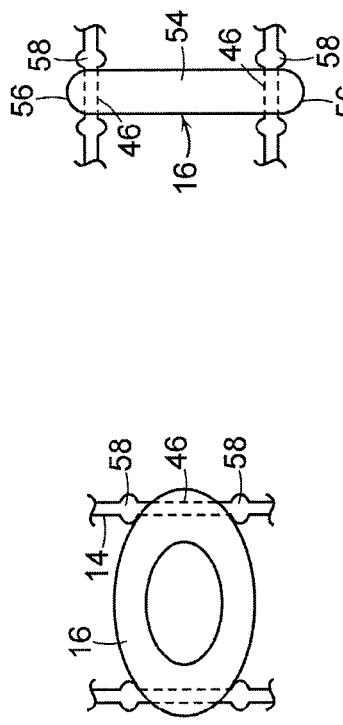
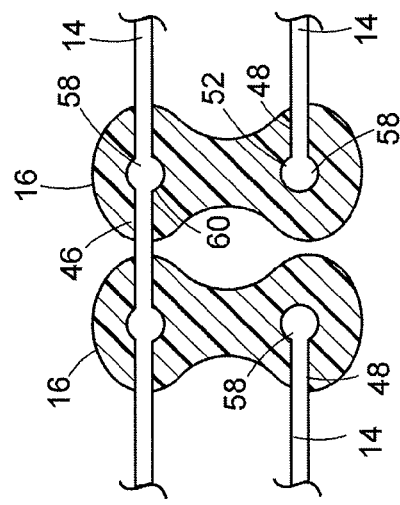
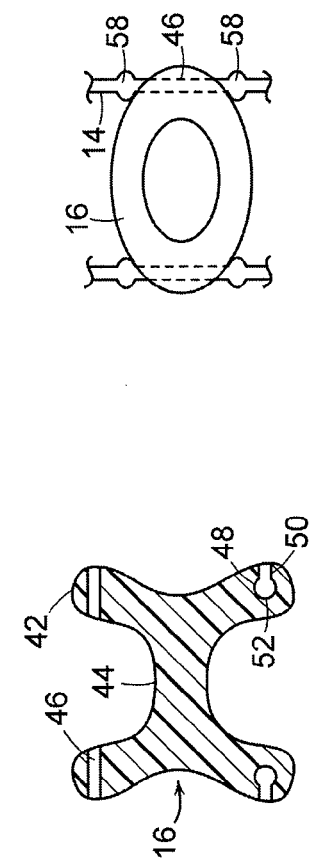
FIG. 3
FIG. 4
FIG. 5
FIG. 6
FIG. 7

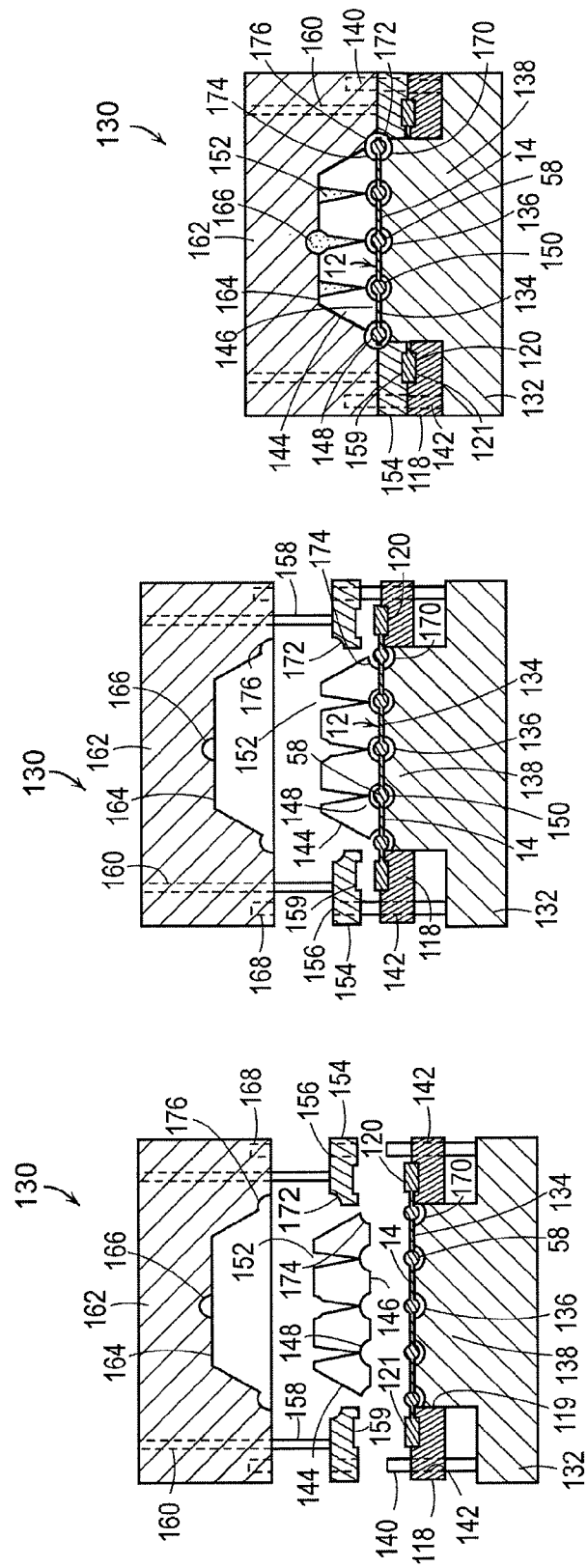

MATERIAL FORMED OF MULTIPLE LINKS AND METHOD OF FORMING SAME

FIELD OF THE INVENTION

This invention relates generally to a material formed of a polymer frame and a plurality of polymer links co-molded with the frame.

BACKGROUND OF THE INVENTION

Pieces of material are often required to accommodate complex curves and surface irregularities, some of which may or may not be constant. For example, producing an upper for an article of footwear provides a significant challenge in that the required curves and surfaces of the upper may change position and dimension in dynamic motion. Clothing also provides significant challenges due to the complex curves and shapes of various body parts. There are numerous applications beyond clothing and footwear where a piece of material, e.g., a sheet, is required to have a complex shape.

Certain materials, such as solid leather, often lack conformable and flexible qualities to accommodate complex shapes. Historically, to overcome the limitations of making items with relatively unforgiving layered sheets of material, sheets of material have been formed by weaving strips of leather, plant material or textile. Textile and stretch textile may also be used for the purposes of providing conformable and flexible qualities. Materials made in this way provide breathability as well, since the non-solid woven material has ventilation apertures formed by the gaps between the yarns or strips.

In unrestricted woven materials, the strips move freely and shift in relation to each other. The spaces between the strips are therefore variable, and provide conformability and flexibility by shifting alignment in relation to anatomical features, for example, or exerted pressure. Producing such materials can be labor intensive and expensive. Additionally, the edges of woven materials have difficulty to solve un-raveling issues when used in cut and sew applications.

Another way to create a flexible, conformable material out of a relatively inflexible starting material is through the interlocking of small individual elements often referred to as links. Links joined together with linear connecting pins, such as those used in metal watchbands, have flexibility along the axis of rotation (pivot point) of the pins. Multiple links threaded together with a connector such as string, wire or elastic can create large flexible expanses of material. Creating linked or beaded material through the process of individually threading each element is time consuming and therefore not cost effective for mass production purposes.

It would be desirable to provide a functional material that is ventilated, flexible, conformable, and has adjustable attributes, without the labor and associated cost of threading the individual elements or weaving individual strips.

It is an object of the present invention to provide a piece of material that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a multi-polymer material providing ventilated, flexible, conformable, and adjustable attributes. Preferred embodiments of the present invention rely upon the incompatible chemistries of two injected polymers to form a frame and links to produce a piece of material formed of the frame and links in a non-bonded state. This bonding incompatibility allows a series of links to rotationally pivot, shift and slide independently of one another along the frame, and thus saves in the labor and difficulty of threading individual links onto a frame matrix. This process creates a material that is flexible and conformable to organically shaped surfaces. The injected polymers and shrinkage rates, as well as the geometry, size and spacing of component parts can be optimized to provide flexibility and meet dynamic performance objectives.

In accordance with one preferred embodiment, a piece of material includes a frame having at least one elongate member formed of a first polymer. At least one link is formed of a second polymer, with a portion of each link co-molded about a portion of at least one elongate member, and at least one link movable with respect to a corresponding elongate member In accordance with another preferred embodiment, a piece of material includes a frame having a plurality of elongate members formed of a first polymer. At least one elongate member includes a plurality of nubs spaced from one another along the elongate member. A plurality of links is formed of a second polymer. The links are movable with respect to the elongate members. A portion of each link is co-molded about a portion at least one elongate member. At least one link includes a recess with an end of an elongate member being received in each recess. At least one link includes an aperture with an elongate member extending through each aperture.

In accordance with a further embodiment, a material includes a frame having a plurality of elongate members formed of a first material and a plurality of links formed of a second material. The first and second materials are capable of being co-molded without bonding to one another, and a portion of each link is co-molded about a portion of at least one elongate member.

In accordance with yet another embodiment, a method of forming a material includes the steps of injecting a first material into a first mold to produce a frame having at least one elongate member; transferring the frame to a second mold; registering the frame securely in place within the second mold; and injecting a second material into the second mold about the frame to create at least one link that is movable with respect to a corresponding elongate member.

In accordance with yet a further embodiment, a method of forming a material includes the steps of injecting a first material into a first mold to produce a frame having at least one elongate member; transferring the frame to a second mold; registering the frame securely in place within the second mold; trimming a portion of the frame upon a closing of the second mold; and injecting a second material into the second mold about the frame to create at least one link that is movable with respect to a corresponding elongate member.

Substantial advantage is achieved by providing a piece of material formed of multiple links mounted on a frame. The fact that the parts can be injected substantially flat, and will upon assembly and use conform to 3-dimensional positions provides manufacturing cost reductions and mold cost savings as compared to traditional injection molded items and traditional stitch and sew materials. Since the parts can be engineered with a specific pop-up geometry from a flat orientation, there is no need to provide complicated injection molds with multiple plates and slides to achieve the necessary compound curvatures required in many applications.

These and additional features and advantages of the invention disclosed here will be further understood from the following detailed disclosure of certain preferred embodiments.

BRIEF DESCRIPTION OF THE DRAWINGS

FIG. 3 is a section view of an embodiment of a link of the material of FIG. 1.

FIG. 4 is a plan view of another embodiment of a link shown in connection with elongate members of the frame of the material of FIG. 1.

FIG. 5 is a plan view of yet another embodiment of a link of the upper of FIG. 1, shown in connection with elongate members of the frame of the upper.

FIG. 6 is a section view of a further embodiment of a link of the upper of FIG. 1, shown in connection with elongate members of the frame of the upper.

FIG. 7 is a section view of yet a further embodiment of a link of the upper of FIG. 1.

FIG. 22 is a section view of a second mold used to form links about the frame molded in the first mold of FIG. 19, shown prior to the mold closing.

FIG. 23 is a section view of a second mold used to form links about the frame molded in the first mold of FIG. 19, shown with an insert plate in contact with the frame.

FIG. 24 is a section view of a second mold used to form links about the frame molded in the first mold of FIG. 19, shown with a plurality of links formed about an elongate member of the frame.

Figure 1:
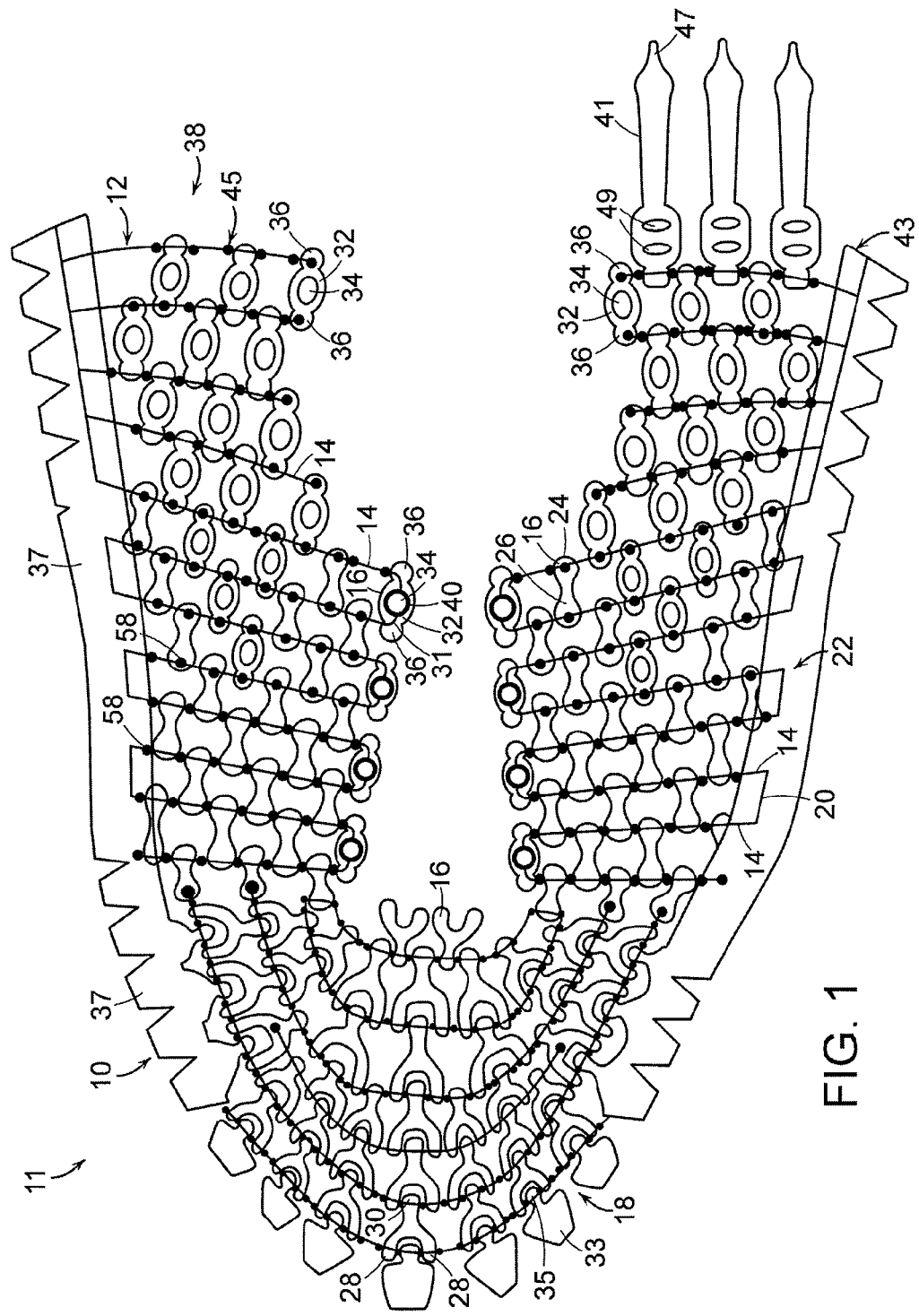
FIG. 1 is a plan view of a piece of material in accordance with a preferred embodiment of the present invention, shown as an upper of an article of footwear in a substantially flat orientation.

The figures referred to above are not drawn necessarily to scale and should be understood to provide a representation of the invention, illustrative of the principles involved. Some features of the piece of material formed of multiple links depicted in the drawings have been enlarged or distorted relative to others to facilitate explanation and understanding. The same reference numbers are used in the drawings for similar or identical components and features shown in various alternative embodiments. Pieces of material formed of multiple links as disclosed herein would have configurations and components determined, in part, by the intended application and environment in which they are used.

DETAILED DESCRIPTION OF CERTAIN PREFERRED EMBODIMENTS

Figure 2:
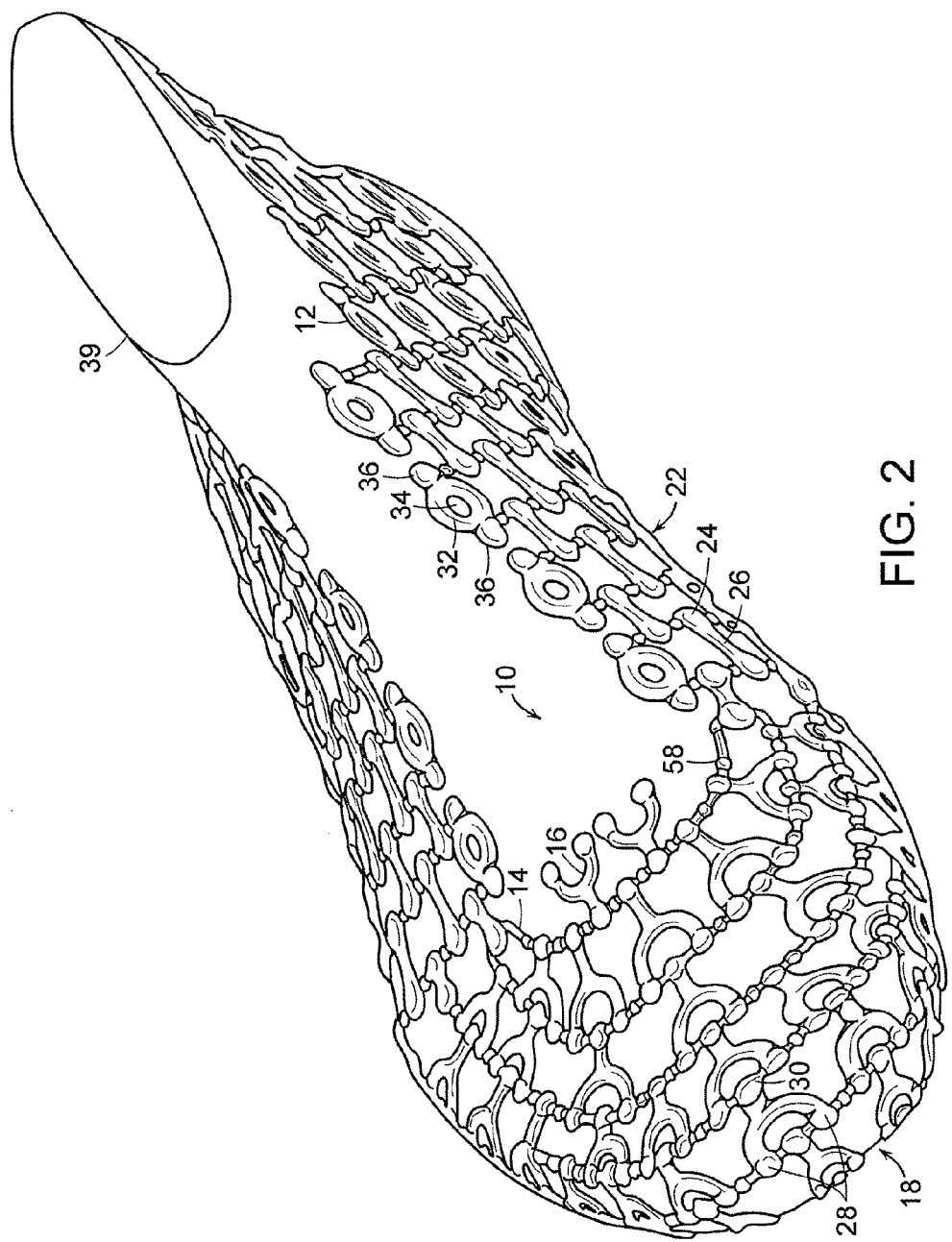
FIG. 2 is a perspective view of the upper of FIG. 1, shown on a last.

The present invention may be embodied in various forms. A preferred embodiment of a piece of material 10 is shown in FIGS. 1-2. In certain embodiments discussed herein, material 10 is shown and described for use as an upper 11 for an article of footwear for exemplary purposes. It is to be appreciated that material 10 may take any desired shape and be used in any desired application, and that material 10 should not be and is not limited to use in articles of footwear. Material 10 has a multitude of possible applications, each of which is considered to be within the scope of the present invention.

Material 10 is formed of a frame 12 comprising a plurality of elongate members 14. A plurality of links 16 is secured to frame 12. Elongate members 14 are formed of a first polymer while links 16 are formed of a second polymer.

Frame 12 is preferably formed of a resilient polymer having a high tensile strength, e.g., at least approximately 6,000 PSI. In a preferred embodiment, the Modulus of Elasticity of the first polymer forming frame 12 is approximately 50,000 PSI to 800,000 PSI. The first polymer may be, for example, polyamide (Nylon), polyamide co-polymers, thermoplastic urethanes, thermoplastic polyesters, polyester copolymers, nanofilled nylons, nanofilled polyesters, or polyolefins. Links 16 are preferably formed of a resilient polymer having a soft tactile feel and a high tensile strength, e.g., at least approximately 500 PSI, and a low hysterisis loss. The Shore hardness of the second polymer forming links 16 is approximately 35 A to 70 D. The second polymer may be, for example, thermoplastic copolyesters, impact modified polyolefins, thermoplastic urethanes, elastomeric polyamides or other thermoplastic elastomeric chemistries such as styrene butadiene styrene (SBS) or ethylene modified (SEBS). In the case of using the links as a sole assembly, the same polymers listed could be converted into injectable thermoplastic foams with the addition of physical or chemical blowing agents or by utilizing gas assisted molding processes.

In certain embodiments, the second polymer may be rigid or semi-rigid, non-stretchable and not elastomeric. Such an embodiment may be useful in forming a watchband, for example. In cases where strength or rigidity is required of the links, the Modulus of Elasticity of the second polymer may be approximately 50,000 PSI to 800,000 PSI. In this case, the second polymer may be for example thermoplastic polyester, thermoplastic polyurethanes, thermoplastic polyamides, thermoplastic polypropylenes, thermoplastic polyethylenes, or other thermoplastic materials. It is to be appreciated that the materials listed, or other thermoplastic materials must be chosen for their inability to bond to, or must be modified to prohibit bonding to the material selected for the frame.

The first and second polymers are different from one another, and have an imcompatible chemistry that allows them to be co-molded without bonding to one another. In a preferred embodiment, frame 12 and links 16 are formed by multi-shot injection molding. Multi-shot injection molding is a process whereby two or more injection shots of polymers are co-joined, with one material being shot onto the first. The process involves molding at least two dissimilar colors or compounds into at least two separate cavities. Thus, for example, the first polymer for frame 12 is shot into a first mold cavity, and then the second polymer for links 16 is shot into a second mold cavity that contains the frame. The dissimilar polymer compounds will not bond to one another, allowing them to move with respect to one another once they have set. Thus, links 16 are free to rotationally pivot, shift and slide independently of one another and otherwise move along frame 12, allowing a user to customize or modify the material to a desired shape.

In certain preferred embodiments, a spray release may be applied to frame 12 prior to the second polymer for links 16 being shot into the second mold cavity, enhancing the ability of links 16 to move with respect to frame 12 and to help prevent bonding of the two polymers.

In other embodiments, chemical lubricants, e.g., silicone based lubricants, halogenated additives, and waxes, may be added to either or both of the first and second polymers to facilitate movement of links 16 with respect to frame 12 and to help prevent bonding of the two polymers.

In certain preferred embodiments, links 16 may be formed of two or more different and compatible materials, e.g., compatible polymers. Similarly, elongate members 14 may be formed of a combination of two or more materials, e.g., compatible polymers.

Frame 12 is formed of one or more elongate members 14. Elongate members 14 may be, as illustrated in some embodiments here, cylindrical in cross-section. However, elongate members 14 may have any desired cross-section. It is to be appreciated that in certain preferred embodiments, or in certain regions of material 10, elongate members 14 may be separate elements spaced from one another, as seen in the forefoot region 18 of upper 11. As seen here in forefoot region 18, frame 12 includes a plurality of elongate members 14 that are substantially parallel to one another and curve outwardly toward the forward-most portion of forefoot region 18.

In other embodiments, or in other regions of material 10 as illustrated here, elongate members 14 may be connected to one another by elongate transverse members 20, as seen in the midfoot region 22 of upper 11. In a preferred embodiment, elongate transverse members 20 are of unitary, that is, one-piece construction with elongate members 14. Such a construction may ease injection flow and provide increased strength. As seen here in midfoot region 22 and heel region 38, a plurality of substantially straight elongate members 14 are spaced from one another in substantially parallel lines.

It is to be appreciated that frame 12 may be formed of a plurality of independent and separate elongate members 14. In such a configuration, material 10 is held together solely by the connection between elongate members 14 and links 16. Alternatively, some or all of the elongate members 14 may be connected directly to one another, such as by elongate transverse members 20.

Links 16 can have a variety of shapes. For example, as seen in midfoot region 22 of material 10, links 16 may have a figure eight, or barbell shape, having end portions 24 that are generally spherical in shape joined by a reduced thickness central or necked portion 26.

Other links 16 are substantially Y-shaped, as seen in the forefoot region 18 of upper 11. Some of the Y-shaped links 16 may have an elongate member 14 passing through each arm 28 and the base 30 of the Y-shape, preferably proximate the ends of each of arms 28 and base 30. The Y-shaped links 16 serve to accommodate the curvature of elongate members 14 in forefoot region 18, with the arms of the Y-shape pointing toward the toe of forefoot region 18. The Y-shaped links 16 provide a greater amount of material of each link 16 on the elongate members 14 that have a greater radius with a smaller amount of material of each link 16 provided on the elongate members with a smaller radius, thus minimizing crowding of links 16 on the elongate members 14 with a smaller radius. This same effect can be realized with other shapes having a smaller amount of material on one side of the link including, for example, a trident shape.

Yet other links 16 may have an oval or circular central section 32 defining a central aperture 34, and tabs 36 formed on opposed sides of central section 32, as seen in a heel region 38 of material 10. Such links 16 may provide additional strength due to their larger size, while reducing weight due to apertures 34. Some of these types of links 16 may be provided in midfoot region 22 at upper edges of material 10, and serve as eyelet links that receive laces (not shown) for a user to secure material 10 when the article of footwear is on the user's foot. In a preferred embodiment, transverse members 31 that connect respective ends of elongate members 14 may extend through the eyelet links 16 and may include an oval or circular segment 40 contained within central section 32. Circular segment 40 serves to reinforce eyelet links 16, providing additional strength for laces, straps, or other fasteners or closure members for footwear 11. It is to be appreciated that any link 16 can be reinforced by extending a portion of an elongate member 14 through a portion of a link 16. Thus, for example, a fastener could be secured to footwear 11 at any location.

Certain links 16 about the periphery of material 10 serve as flanges that allow material 10 to be secured to a sole assembly. In a preferred embodiment, links 16 about the periphery of forefoot region 18 of material 10 include tabs 33 extending outwardly from a base portion 35 through which an elongate member 14 extends. In a preferred embodiment, an extended link 16 is provided along the length of midfoot region 22 and heel region 38 of material 10 on both the lateral and medial sides, with a plurality of tabs 37 extending outwardly therefrom. Tabs 37 may have any of a number of configurations and sizes. Tabs 33 and 37 may be secured to corresponding tabs or flanges on the sole assembly by stitching, adhesive, welding or any other suitable fastening means.

Upper 11, as seen in FIG. 1, may be formed in a flat configuration and then manipulated to form the complex shape necessary to conform to the instep ankle and heel of a user's foot. Upper 11 is seen in FIG. 2, wrapped about a last 39. Heel region 38 is wrapped about last 39 and secured to itself with one or more fasteners 41, seen in FIG. 1. As illustrated here, fasteners 41 are elongate members having one end anchored to a lateral side 43 of material 10. When heel region 38 is wrapped about last 39, fasteners 41 are looped through frame 12 on medial side 45 of material 10.

Ends 47 of fasteners 41 are then looped through apertures 43 formed in fasteners 41 in known fashion to secure fastener 41 about last 39 in proper position. It is to be appreciated that fasteners 41 may have any desired configuration. For example, fasteners 41 could include hook and loop fastening elements or male/female snap-fit elements. Additionally, one or more fasteners 41 could be provided on medial side 45, or one or more fasteners could be provided on medial side 45 with one or more additional fasteners 41 provided on lateral side 43. It is to be appreciated that in certain embodiments, fasteners 41 can be constructed to be adjustable by the user, while in other embodiments fasteners 41 can be constructed so as to be permanently fixed in a predetermined position during the manufacturing process.

Another shape for link 16 is illustrated in FIG. 3 (link 16 is illustrated here in cross-section without the corresponding elongate members 14 for clarity purposes), in which link 16 is substantially H-shaped, with four legs 42 and a central transverse member 44 connecting the legs. As can be seen here and in FIG. 1, one or more apertures 46 are provided in some of links 16, through which an elongate member 14 extends. Links 16 may also include one or more recesses 48 into which an end of an elongate member extends. As illustrated here, recess 48 may consist of an elongate portion 50 in communication with an exterior of link 16 and a chamber 52 connected to elongate portion 50. Chamber 52 is formed as link 16 is molded about elongate member 14, and therefore has a shape mating that at the end of the corresponding elongate member 14 received in recess 48. As illustrated here, chamber 52 has a generally spherical shape, which allows rotational pivoting in ball and socket fashion.

Since the first and second polymers are not bonded to one another, links 16 are free to move along and/or pivot about elongate members 14. Thus, after material 10 has been formed, links 16 can be moved along frame 12 to a desired position in instances where elongate members 14 extend through an aperture 46.

An additional shape for a link 16 is shown in FIG. 4, in which link 16 is toroidal, or doughnut shaped. Yet another shape for a link 16 is shown in FIG. 5, in which link 16 has a cylindrical body 54 with hemispherical ends 56. It is to be appreciated that many other shapes will be suitable for link 16, and other suitable shapes will become readily apparent to those skilled in the art, given the benefit of this disclosure.

In certain preferred embodiments, a plurality of nodules or nubs 58 are provided on elongate members 14, as can be seen in FIGS. 1, 4-6. Nubs 58 serve as positioning elements or locators for links 16, helping to temporarily secure links 16 in a desired position along elongate members 14. In certain preferred embodiments, links are positioned adjacent nubs 58 in an abutting relationship, as seen in FIGS. 4-5. In other preferred embodiments, as illustrated in FIG. 6, nubs 58 are positioned within chamber 52 of a recess 48 formed in link 16 with elongate member 14 extending outwardly from link 16 in one direction. In other preferred embodiments, nubs 58 are positioned within a chamber 60 formed in an aperture 46, with elongate member 14 extending through link 16 in both directions from chamber 60. Chamber 60 is formed as link 16 is molded about elongate member 14, and, therefore, has a shape mating that of nub 58. As illustrated here, nubs 58 and chambers 60 are substantially spherical. It is to be appreciated that nubs 58 and chambers 60 can have any desired shape.

Another preferred embodiment of a nub 58 and corresponding chamber 60 is seen in FIG. 7, in which nub 58 includes flanges 62 extending outwardly from nub 58. Accordingly, chamber 60 includes recesses 64 that mate with and receive flanges 62. The engagement of flanges 62 within recesses 64 prevents rotation of link 16 with respect to elongate member 14, which may be desirable in certain constructions. As seen here, flanges 62 and recesses 64 are substantially rectangular in cross-section. It is to be appreciated that flanges 62 and recesses can have any desired shape. In other preferred embodiments, also illustrated in FIG. 7, an elongate member 14 may have a rectangular profile, which also prevents rotation of link 16 with respect to elongate member 14. It is to be appreciated that elongate members 14 may have any desired profile.

Figure 8:
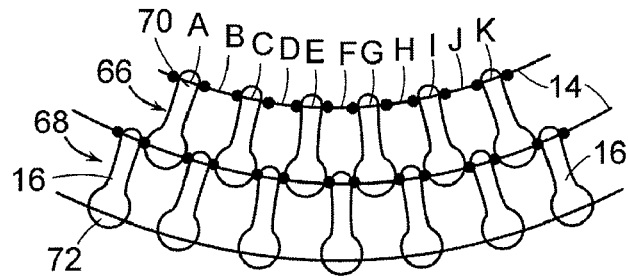
FIG. 8 is a plan view of a portion of a piece of material in accordance with the present invention, showing a plurality of links on the frame in a first position.
Figure 9:
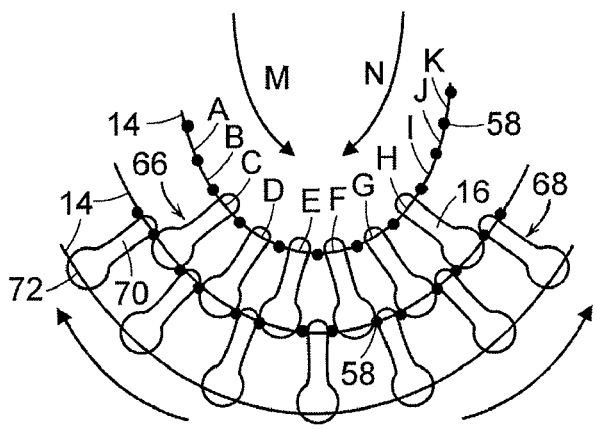
FIG. 9 is a plan view of the links and frame of FIG. 8 shown in a second position.

As noted above, links 16 may move along respective elongate members 14, allowing complex shapes to be formed. An example of altering the shape of material 10 is illustrated in FIGS. 8-9, in which the movement of a plurality of links 16 along elongate members 14 with a "drawstring" effect can be seen. FIG. 8 illustrates an initial configuration with three elongate members 14 and an upper row 66 and a lower row 68 of links 16 connected to adjacent elongate members 14. The links 16 illustrated here have an elongate portion 70 and a bulbous end portion 72. An elongate member 14 extends through an end of each elongate portion 70 and through each end portion 72.

In the initial configuration a first radius for elongate members 14 provides a slight curve to elongate members 14. As can be seen in the uppermost elongate member 14, the lengths of the uppermost elongate member 14 between adjacent nubs 58 has been labeled A-K. In this initial configuration, a pair of nubs 58 and a corresponding length of elongate member is positioned between each elongate portion 70 along the uppermost elongate member 14, with each elongate portion 70 positioned along a particular length of elongate member 14. Thus, elongate portions 70 are positioned along lengths A, C, E, G, I and K, with lengths B, D, F, H and J, along with corresponding pairs of nubs 58 positioned adjacent elongate portions 66. Thus for the six elongate portions 66, eleven lengths A-K are required.

A plurality of nubs 58 are provide along the central elongate member 14, with each nub 58 abutting an end portion 72 from upper row 66 of links 16 and an elongate portion 70 from lower row 68 of links 16. No nubs 58 are provided along the lowermost elongate member 14 in this embodiment. As can be seen here, each link 16 in upper row 66 and lower row 68 has a first narrow end and a second wider end. The narrow end is connected to the elongate member 14 that has a radius that is smaller than the radius of the elongate member 14 to which the wider end is connected.

In FIG. 9, the "drawstring" effect can be seen, where elongate portions 70 of upper row 66 of links 16 have been compressed together such that they are separated from one another solely by a nub 58. Thus, elongate portions 70 have been moved inwardly along the upper elongate member 14 toward one another in the direction of arrows M and N, with elongate portions now positioned along lengths C, D, E, F, G, and H. End portions 72 on the lower row 68 of links 68 are now spaced from one another a greater distance, with elongate members 14 now being curved to a much greater extent to accommodate the fanning out of links 16. In this configuration, elongate members 14 have a second radius than the first radius seen in FIG. 8. This construction is one way to cause previously flat portion of footwear 11 to spring into a three-dimensional shape. This and other configurations of links 16 and elongate members 14 advantageously allow the flat-formed elements to pop into a three-dimensional shape during lasting.

Figure 10:
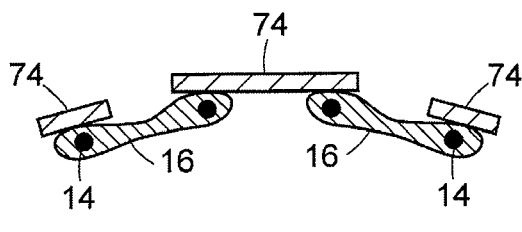
FIG. 10 is a section view of an alternative embodiment of the material of FIG. 1, showing a plurality of plates secured to the links.

In certain preferred embodiments, as seen in FIG. 10, a plurality of plates 74 may be secured to material 10, with plates 74 shown here being secured to links 16. In a preferred embodiment, plates 74 are formed of a soft material, providing padding and comfort for applications where material 10 is in contact with a user's body. Plates 74 may be secured to the interior material 10, providing comfort where the user's body comes in contact with material 10. In other embodiments, plates 74 may be secured to the exterior of material 10, providing protection for links 16 and elongate members 14 from the elements and from wear. In a preferred embodiment, plates 74 are formed of a non-woven textile, such as a felt material, which will not fray. Plates 74 may be secured to links 16 by an adhesive, for example, or by welding such as RF welding, laser welding, or by heat press. It can be appreciated that plates 74 can naturally move along frame 12 with links 16. As seen in FIG. 10, each plate 74 may be secured to a single link 16 at single or multiple points, or it may span and be secured to two or more links 16, providing greater coverage over a portion of material 10.

Figure 11:
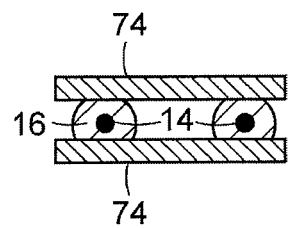
FIG. 11 is section view of an alternative embodiment of the material of FIG. 1, showing a plurality of plates secured to interior and exterior sides of a pair of links.

As seen in FIG. 11, plates 74 may be secured to both an interior and exterior surface of a portion of material 10. Each of the plates 74 may be formed of the same material, or may be formed of different materials to serve different functions. For example, the plate 74 secured to an exterior surface of material 10 could be formed of a waterproof material, while the plate 74 secured to an interior surface of material 10 could be formed of a soft material to provide comfort for the user's foot.

Figure 12:
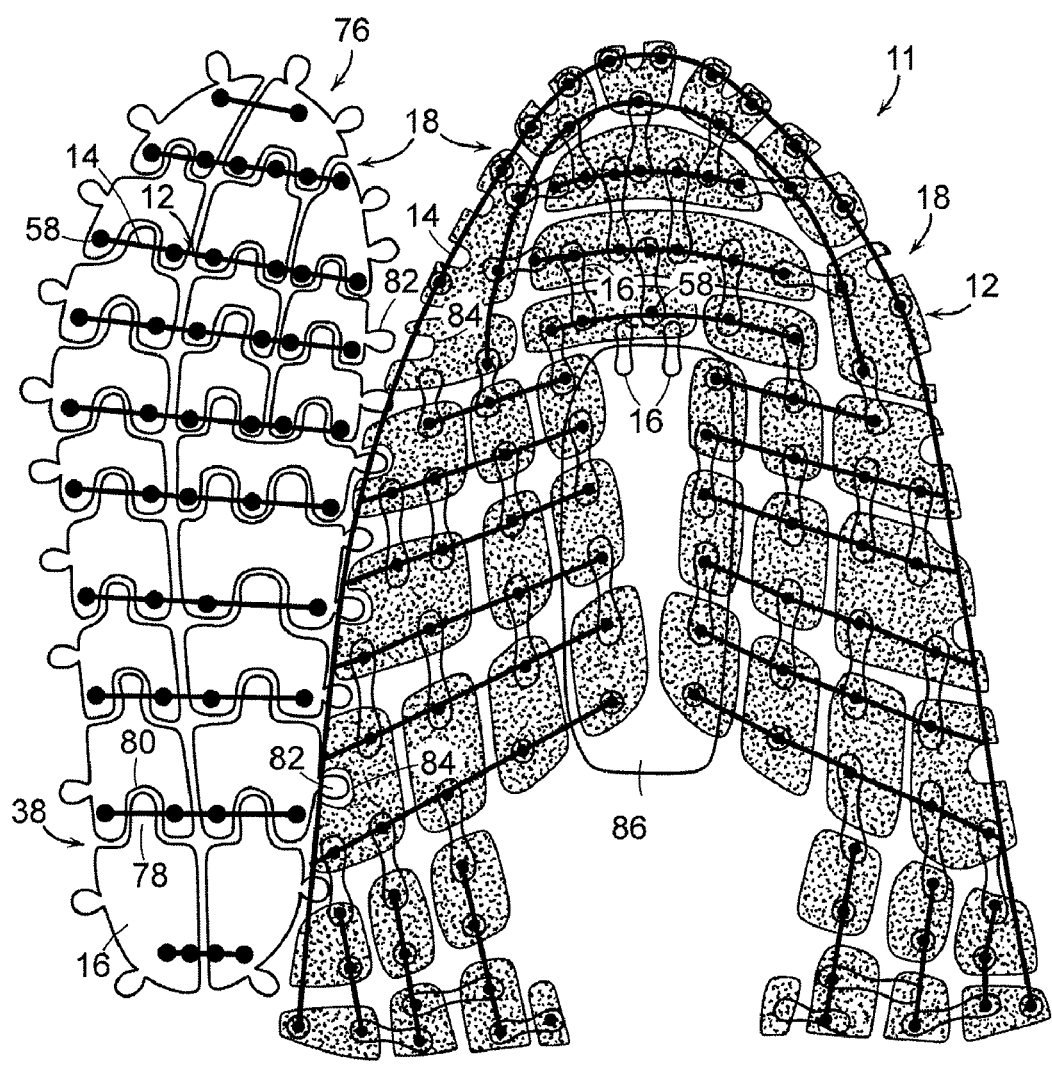
FIG. 12 is a plan view of another preferred embodiment of the present invention, showing an article of footwear formed of the material of the present invention, having an upper formed of links on a frame with plates secured to the links, and a sole assembly formed of a plurality of links on a frame.
Figure 13:
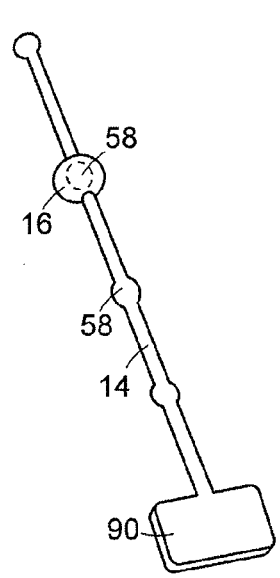
FIG. 13 is a perspective view of an alternative embodiment of a link of the material of FIG. 1, shown in connection with an elongate member of the frame.

As seen in FIG. 12, a sole assembly 76 can be secured to upper 11 to form an article of footwear, with sole assembly 76 also formed of a plurality of links 16 on a frame 12. The elongate members 14 of frame 12 may be substantially parallel to one another and extend transversely across sole assembly 76. In a preferred embodiment, one or more of links 16 of sole assembly 76 include one or more tabs 78 that are nested and received in corresponding recesses 80 formed in adjacent links 16. Respective elongate members 14 extend through tabs 78 and the adjacent links 16, providing pivoting between adjacent links 16 and flexibility for sole assembly 76. In the illustrated embodiment, the nubs 58 on elongate members 14 are received within chambers 52, 60 formed in recesses 48 and apertures 46, respectively, in links 16 (not shown here), as discussed above with respect to FIG. 6.

In the illustrated embodiment, peripheral links 16 of sole assembly 76 include tabs 82 that are received in corresponding recesses 84 formed in corresponding plates 74 of upper 11. Alternatively, tabs 82 could be received in recesses formed in links 16 of upper 11. Alternatively, sole assembly 76 could include links 16 that serve as flanges and which could include tabs 33, 37 similar to those described above in connection with FIG. 1. Such tabs 33, 37 could be secured to the tabs 33, 37 of material 10 by stitching, adhesive or other suitable fastening or bonding means.

A tongue 86 is secured to material 10. In a preferred embodiment, a pair of links 16 in a vamp of forefoot region 18 is used to secure tongue 86 to material 10. It is to be appreciated that tongue 86 can be secured to material 10 in many ways, including the use of Y-shape links as seen in the vamp area of forefoot region 18 of the upper shown in FIG. 1. Other suitable means for securing tongue 86 to material 10 will become readily apparent to those skilled in the art, given the benefit of this disclosure.

Figure 20:
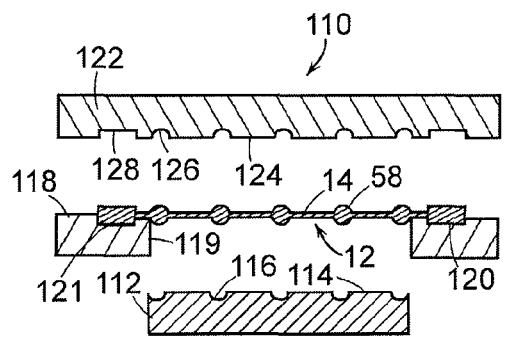
FIG. 20 is an exploded view of the first mold of FIG. 19.

Another preferred embodiment of a link 16 is shown in FIG. 20, in which link 16 comprises a spherical member, which encompasses or surrounds a nub 58. An attachment pad 90 is found at an end of elongate member 14. In a preferred embodiment, attachment pad 90 is unitary, that is of one-piece construction, with elongate member 14. Attachment pad 90 serves as an anchor or fastening point, with which to secured elongate member 14 to another element of material 10 or any other object, such as another portion of an article of footwear.

Figure 14:
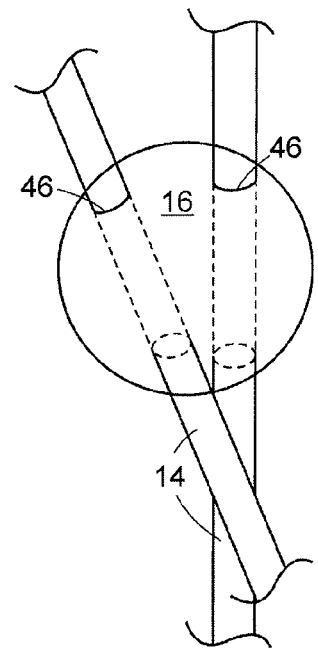
FIG. 14 is a perspective view of the link of FIG. 13, shown with two elongate members extending therethrough.

An alternative embodiment of a spherical link 16 is seen in FIG. 14, in which two elongate members 14 protrude through apertures 46 in link 16. As illustrated here, elongate members 14 extend through link 16 at an angle with respect to one another. It is to be appreciated that elongate members 14 can be parallel to one another, or be positioned at any angle with respect to one another.

Figure 15:
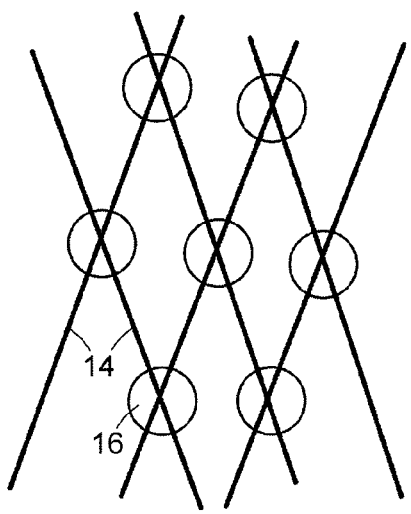
FIG. 15 is a is a plan view of an alternative embodiment of a portion of the material of FIG. 1, shown using the links of FIG. 13 and a plurality of elongate members.

A portion of material 10 utilizing elongate members 14 that extend through spherically shaped links 16 at an angle with respect to one another to create a mesh pattern is shown in FIG. 15. It is to be appreciated that in certain preferred embodiments the elongate members 14 can be formed of different polymers and, therefore, will have different properties providing varied effects across material 10. For example, material 10 could have differential stretch in different directions.

Figure 16:
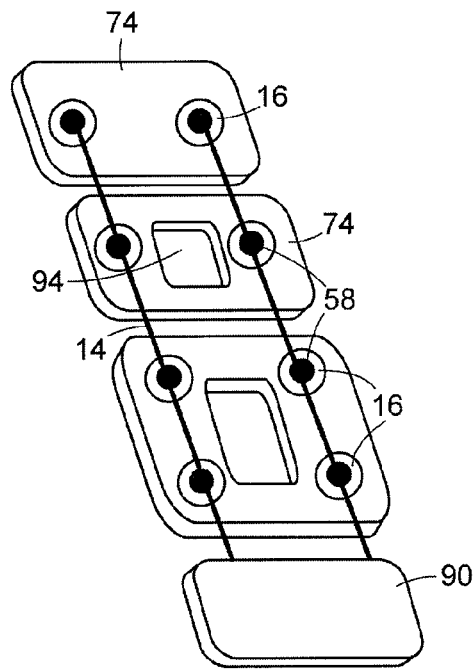
FIG. 16 is a perspective view of an alternative embodiment of the links and elongate members of the material of FIG. 1, shown in connection with a plurality of plates.

An alternative embodiment is shown in FIG. 16, in which ends of a pair of elongate members 14 share an attachment pad 90, which may be secured to another portion of an article of footwear. Plates 74 are secured to links 16, which are illustrated here as spherically shaped links 16. In certain embodiments, plates 74 may include an aperture 94, which serves to reduce the weight of plates 74 and can provide ventilation for material 10. As seen here, each elongate member 14 can be secured to a corresponding plate by a single link 16 secured to a plate 74, or by multiple links 16 secured to the plate 74.

Figure 17:
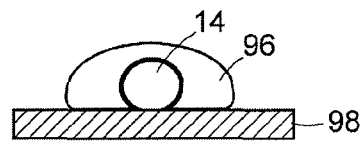
FIG. 17 is section view of an alternative embodiment of a link and an elongate member in accordance with the present invention, shown secured to a sheet of material.

Another embodiment of material 10 is shown in FIG. 17, in which link 96 does not completely surround elongate member 14. Rather, link 96 cooperates with a sheet 98 to capture elongate member 14. As seen here, link 96 wraps around approximately 50% to approximately 95% of elongate member 14. In this embodiment, the tooling used to form material 10 can be greatly simplified, since the mold use to make link 96 does not need two perfectly mated cavities to create link 96 around an elongate member 14. Sheet 98 is held in one side of a mold while the other side of the mold forms link 96 about elongate member 14. Sheet 98 and link 96 cooperate to capture elongate member 14. Sheet 98 may be formed of, for example, a textile, or a polymer that will adhere to link 96, thereby securing sheet 98 and link 96 to one another.

Figure 18:
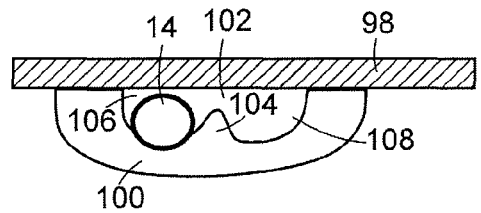
FIG. 18 is section view of an alternative embodiment of the link and elongate member of FIG. 17, shown secured to a sheet of material.

Another embodiment of a link 100 is shown in FIG. 18, in which link 100 has an oversized cavity 102 in which elongate member 14 may be located in more than one position. In this embodiment, link 100 is molded separately from elongate member 14. As illustrated here, cavity 102 includes a projection 104 dividing cavity 102 into a first portion 106 and a second portion 108. Elongate member 14 is placed in one portion of cavity 102 (seen here as first portion 106) and sheet 98 is bonded to link 100, such as by an adhesive, welding or overmolding process. Elongate member can easily be moved to second portion 108, providing adjustability for material 10. It is to be appreciated that cavity 102 may include more than one projection 104, thereby providing cavity 102 with more than two portions.

Figure 19:
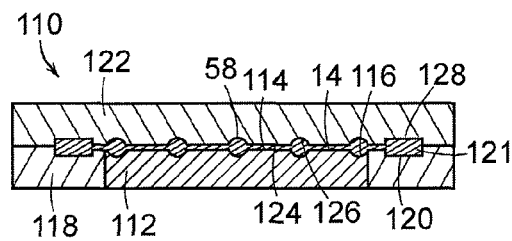
FIG. 19 is a section view of a portion of a first mold used to make the frame of the material of the present invention.
Figure 21:
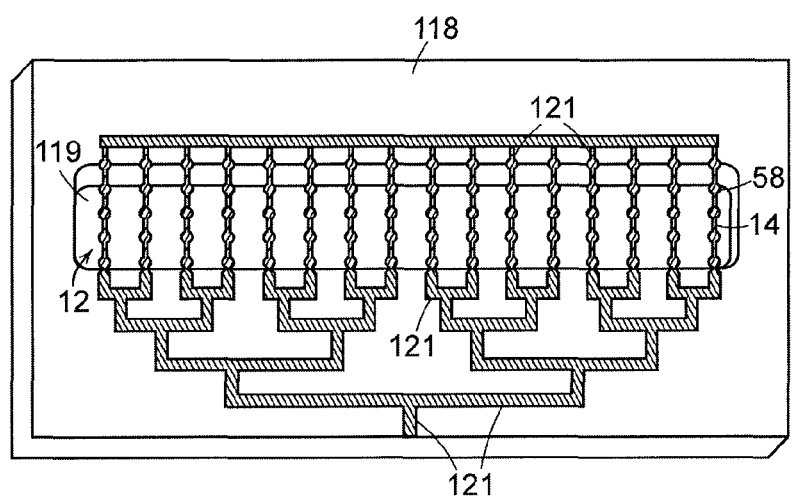
FIG. 21 is a perspective view of a transfer plate of the first mold of FIG. 19, shown with the frame.

A first mold 110 suitable for forming frame 12 is shown in FIGS. 19-21. First mold 110 includes a first portion 112 having at least on elongate semi-circular recesses 114 (only one is visible in FIGS. 19-20), each of which serves to form one side of an elongate member 14. Positioned along recesses 114 may be one or more hemispherical recesses 116 that serve to form one side of nubs 58.

A transfer plate 118 has a central aperture 119 in which first portion 112 is seated. Transfer plate 118 includes one or more recesses 120 in which runners 121 are formed when frame 12 is formed.

First mold 110 includes a second portion 122 having at least one elongate semi-circular recess 124, each of which mates with a recess 114 in first portion 112 when first portion 112 and second portion 122 are joined together, thereby forming elongate members 14. Positioned along recesses 124 are one or more hemispherical recesses 126 that mate with recesses 116 in first portion 112 to form nubs 58. Second portion 122 also includes one or more recesses 128 that mate with recesses 120 in transfer plate 118 to form runners 121. It is to be appreciated that in certain preferred embodiments, runners 121 could be seated entirely in recesses 120 such that their upper exposed surface is substantially flush with the surface of transfer plate 118, in which case second portion 122 would not require recesses 128.

When first mold 110 is closed and first portion 112 and second portion 122 are mated together, the material used to form frame 12 is injected through runners 121, thereby filling the recesses in first and second portions 112, 122 to form elongate members 14 and nubs 58. After frame 12 has been formed, first mold 110 is opened and first portion 112 and second portion 122 are removed from transfer plate 118. Elongate members 14 extend across aperture 119 and are held in place by runners 121, which are captured in recesses 120, as seen in FIG. 21.

Links 16 can now be formed about frame 12, as seen in FIGS. 22-25. Transfer plate 118 is positioned in a second mold 130. Second mold 130 includes a first portion 132 that includes at least one elongate semi-circular recess 134, each of which receives an elongate member 14 of frame 12. One or more hemi-spherical recesses 136 may be positioned along recesses 134 and receive nubs 58. A raised central portion 138 first portion 132 extends into central aperture 119 of transfer plate 118. A set of first pins 140 extends outwardly from first portion 132 are received in corresponding apertures 142 formed in transfer plate 118, and serve to register transfer plate 118 with respect to first portion 132.

An insert plate 144 is positioned over frame 12 and includes at least one semi-circular recess 146, each of which cooperates with a recess 134 in first portion 132 to receive an elongate member 14. One or more hemispherical recesses 148 may be positioned along recesses 146 cooperate with recesses 136 in first portion 132 to receive nubs 58. It is to be appreciated that recesses 136 and 148 do not come into contact with nubs 58 in this embodiment. Rather, a link recess 150 is formed about each nub 58, as seen in FIG. 23. Link recesses 150 serve to form links 16 when the second material is injected or otherwise directed into second mold 130. It is to be appreciated that links 16 need not be formed exclusively about nubs 58. As discussed above, links 16 can be formed about any portion of frame 16, and can take any desired shape. Consequently, recesses 136 and 148 are only hemi-spherical for embodiments where links 16 are to be spherically shaped.

Openings or gate cavities 152 are formed in insert plate 144, and serve to provide a channel through which the material to form links 16 reaches link recesses 150. A cutting plate 154 extends around insert plate 144 and includes apertures 156 that receive first pins 140, thereby registering cutting plate 154 with respect to first portion 132. A set of second pins 158 extends outwardly from cutting plate 154 and are received in apertures 160 formed in a second portion 162 of second mold 130. Cutting plate 154 includes recesses 159 that receive a portion runners 121, thereby capturing runners 121 between cutting plate 154 and transfer plate 118.

Second portion 162 includes a recess 164 that receives a portion of insert plate 144 when second mold 130 is closed. An opening or sprue cavity 166 is in fluid communication with recess 164 and an exterior of second portion 162. When second mold 130 is closed, sprue cavity 166 is also in fluid communication with gate cavities 152, providing a channel for the material to form links 16 to enter second mold 130 and enter link recesses 150 to form links 16. Second portion 162 also includes recesses 168 to receive pins 140 when second mold 130 is closed.

In operation, as seen in FIG. 22, transfer plate 118 is positioned on first portion 132, with raised central portion 138 extending into central aperture 119 of transfer plate 118. Frame 12 rests on first portion 132, with elongate members 14 seated in recesses 134. Insert plate 144 is then positioned on raised central portion 138, thereby capturing a portion of frame 12. Cutting plate 154 is then positioned on pins 140, initially capturing runners 121, and is then moved past frame 12, forcing transfer plate 118 further onto raised central portion 138, thereby shearing off runners 121 from frame 12, as seen in FIGS. 23-24. It can be seen in FIG. 24 that runners 121 remain captured between transfer plate 118 and cutting plate 154.

As can be seen in FIG. 24, first portion 132 includes arcuate recesses 170 on its exterior edge that are somewhat less than hemi-spherical. These arcuate recesses 170 cooperate with arcuate recesses 172 formed on an interior edge of cutting plate 154 to form a complete hemispherical recess. Similarly, insert plate 144 includes arcuate recesses 174 on its exterior edge that cooperate with arcuate recesses 176 formed on recess 164 of second portion 162 to form a hemispherical recess that mates with the hemispherical recess formed by arcuate recesses 170, 172 when second portion 162 is placed on pins 158 and second mold 130 is closed, as seen in FIG. 24. These hemispherical recesses form links 16 on exterior edges of frame 12.

Once second mold 130 is closed, the material used to form links 16 is injected or otherwise inserted through sprue cavity 166, passing through gate cavities 152 and into link recesses 150, thereby forming links 16.

Figure 25:
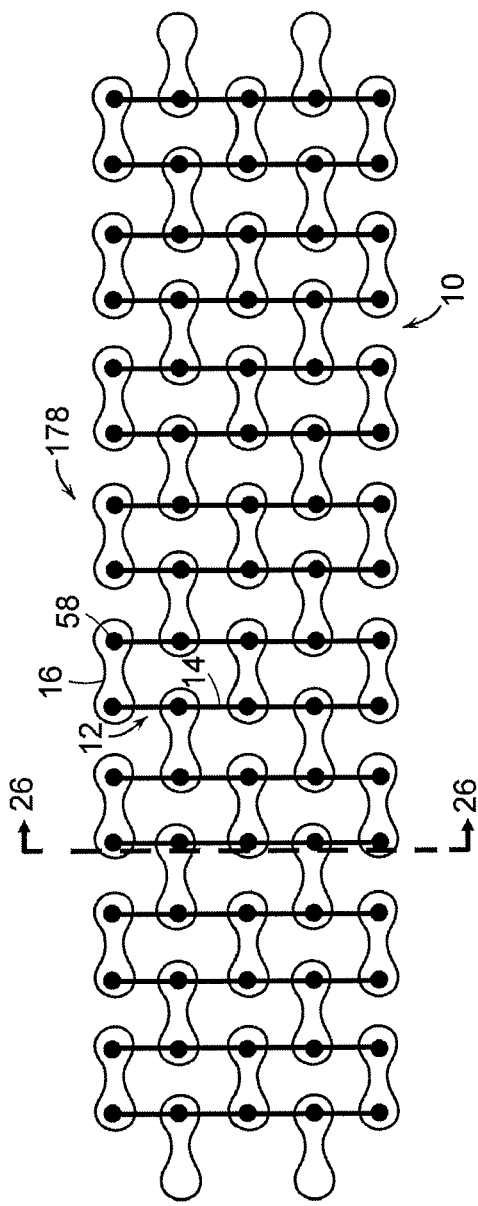
FIG. 25 is a plan view of the material formed by the molds of FIGS. 19-24, shown here as a band.
Figure 26:
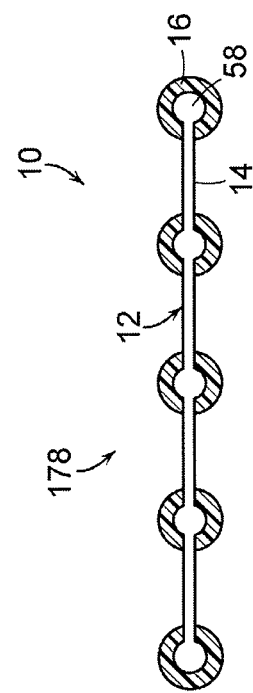
FIG. 26 is a section view, taken along line 26-26 of FIG. 25, of the band of material of FIG. 25.

The configuration of this embodiment of second mold 130 provides for a material 10, seen in FIGS. 25-26 as a band 178. Band 178 may be suitable as a watchband, for example, or any other flexible length of material. It is to be appreciated that band 178 could be used in many applications, and that material 10 can be formed in many shapes other than the substantially rectangular band 178 shown here. In this embodiment, frame 12 is not visible at the edges of band 178, since a link 16 is formed about each endmost portion of frame 12, namely a nub 58.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A material comprising, in combination:
   a frame comprising at least one elongate member formed of a first polymer, at least one elongate member including a plurality of nubs spaced from one another along the elongate member; and
   at least one link formed of a second polymer, a portion of each link co-molded about a portion of at least one elongate member, and at least one link movable with respect to a corresponding elongate member, wherein at least one nub serves to position the at least one link along the elongate member.

2. The material of claim 1, wherein at least one link is free to pivot about an elongate member.

3. The material of claim 1, wherein at least one link is free to slide along an elongate member.

4. The material of claim 1, wherein at least one link has at least one aperture, and an elongate member extends through each aperture, the link being pivotable about and slidable along the elongate member.

5. The material of claim 4, wherein at least one elongate member and corresponding aperture have a circular cross-section.

6. The material of claim 4, wherein at least one elongate member and corresponding aperture have a rectangular cross-section.

7. The material of claim 1, wherein at least one link includes a recess, and an end of an elongate member is received in each recess.

8. The material of claim 1, wherein at least one nub is substantially spherical.

9. The material of claim 1, wherein at least one link has at least one aperture, and an elongate member extends through each aperture, the link being pivotable about and slidable along the elongate member.

10. The material of claim 9, wherein at least one aperture has a chamber formed therein, a nub being positioned in the chamber.

11. The material of claim 10, further comprising at least one recess extending outwardly from at least one chamber and at least one flange on at least one elongate member, each flange being received in a corresponding recess.

12. The material of claim 1, wherein at least one link has at least one recess, an end of an elongate member being received in each recess.

13. The material of claim 12, wherein at least one recess has a chamber formed therein, a nub being formed at an end of an elongate member and received in the chamber.

14. The material of claim 1, wherein at least one link is positioned along an elongate member between adjacent nubs, the nubs restricting movement of the link along the elongate member.

15. The material of claim 1, wherein a plurality of nubs is positioned on an elongate member between adjacent links.

16. The material of claim 1, wherein at least one link is substantially Y shaped, with an aperture formed proximate an end of each arm of the Y shape and proximate an end of a base of the Y shape, an elongate member extending through each aperture.

17. The material of claim 1, wherein at least one link is substantially oval, with an aperture formed proximate each end of the oval shape, an elongate member extending through each aperture.

18. The material of claim 17, wherein at least one oval shaped link includes an extension member at each end of the oval shape, the apertures being formed proximate an exposed end of each of the extension members.

19. The material of claim 17, wherein at least one oval shaped link includes a central aperture formed therein.

20. The material of claim 1, wherein at least one link is substantially H shaped.

21. The material of claim 20, wherein an aperture is formed proximate an end of at least one leg of the H shape, an elongate member extending through each aperture.

22. The material of claim 20, wherein recess is formed proximate an end of at least one leg of the H shape, an end of an elongate member being received in each recess.

23. The material of claim 1, wherein at least one link has a first end with a substantially circular cross-section, a second end with a substantially circular cross-section, and a reduced thickness portion joining the first and second ends.

24. The material of claim 1, wherein at least one link is substantially cylindrical with substantially hemi-spherical ends.

25. The material of claim 1, wherein at least one link is asymmetrical in section.

26. The material of claim 1, wherein a portion of the frame comprises a plurality of elongate members spaced from and substantially parallel to one another.

27. The material of claim 26, wherein the elongate members of the portion of the frame are curved.

28. The material of claim 1, wherein ends of adjacent elongate members of the frame are connected to one another with elongate transverse members formed of the first polymer.

29. The material of claim 28, wherein the elongate members and elongate transverse members are of unitary construction.

30. The material of claim 1, wherein at least one of the elongate members is curved.

31. The material of claim 1, further comprising a plurality of plates, each plate being secured to at least one link.

32. The material of claim 31, wherein the plates are formed of a non-woven textile.

33. The material of claim 31, wherein the plates are formed of a polymer.

34. The material of claim 31, wherein at least one plate is secured to a link in multiple locations.

35. The material of claim 31, wherein at least one plate includes an aperture.

36. The material of claim 1, wherein the first polymer is a polyamide.

37. The material of claim 1, wherein the second polymer is polyester.

38. The material of claim 1, wherein at least one link includes a tab and at least one link includes a recess, each recess receiving a tab of an adjacent link.

39. The material of claim 1, wherein the first and second polymers are capable of being co-molded without bonding to one another.

40. The material of claim 1, further comprising at least one attachment tab, each attachment tab formed on an elongate member.

41. The material of claim 1, further comprising a sheet of material, each link secured to the sheet of material and having a cavity formed therein, the link positioned within the cavity.

42. The material of claim 41, wherein the cavity includes a projection defining a first portion of the cavity and a second portion of the cavity, the link movable between the first portion and the second portion.

43. A material comprising, in combination:
  a frame comprising a plurality of elongate members formed of a first material, at least one elongate member including a plurality of nubs spaced from one another along the elongate member; and
  a plurality of links formed of a second material, wherein at least one of the nubs serves to position one of the links along one of the elongate members;

wherein the first and second materials are capable of being co-molded without bonding to one another, and a portion of each link is co-molded about a portion of at least one elongate member.

44. The material of claim 43, wherein the links and frame are configured to be co-molded in a flat configuration and popped into a three dimensional shape during assembly.

45. The material of claim 43, wherein a plurality of the elongate members are curved and substantially parallel to one another with links extending between adjacent elongate members, a plurality of the links having a narrow end and a wider end, each narrow end connected to an elongate member having a radius smaller than a radius of an elongate member to which the wider end is connected.

46. The material of claim 45, wherein the plurality of links having a narrow end and a wider end are substantially Y-shaped.

47. The material of claim 45, wherein each of the plurality of curved elongate members have an first radius and a second smaller radius created by moving the narrow ends of the plurality of links closer together along the elongate member to which they are attached.

48. The material of claim 43, wherein the links are formed of two compatible polymers.

49. The material of claim 43, wherein the elongate members are formed of two compatible polymers.

* * * * *